US012352175B2

(12) United States Patent
Kovanis et al.

(10) Patent No.: US 12,352,175 B2

(45) Date of Patent: Jul. 8, 2025

(54) ANNULUS FILLER FOR A GAS TURBINE ENGINE

(71) Applicant: ROLLS-ROYCE PLC, London (GB)

(72) Inventors: Anastasios Kovanis, Derby (GB); Andrew Mekeresz, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/742,421

(22) Filed: Jun. 13, 2024

(65) Prior Publication Data

US 2025/0012198 A1 Jan. 9, 2025

(30) Foreign Application Priority Data

Jul. 4, 2023 (GR) .............................. 20230100539

(51) Int. Cl.

*F01D 11/00* (2006.01)
*F01D 5/30* (2006.01)

(52) U.S. Cl.

CPC .............. *F01D 11/008* (2013.01); *F01D 5/30* (2013.01); *F01D 5/3007* (2013.01); *F01D 11/006* (2013.01); *F05D 2240/80* (2013.01)

(58) Field of Classification Search

CPC ........ F01D 11/008; F01D 11/006; F01D 5/30; F01D 5/3007; F05D 2240/80

See application file for complete search history.

(56) References Cited

U.S. PATENT DOCUMENTS

| | | | | |
|---|---|---|---|---|
| 6,632,070 | B1 * | 10/2003 | Tiemann | F01D 11/008 415/209.2 |
| 6,634,863 | B1 * | 10/2003 | Forrester | F01D 5/06 416/193 A |
| 6,726,452 | B2 * | 4/2004 | Strassberger | F01D 11/008 416/193 A |
| 8,297,931 | B2 | 10/2012 | Read et al. | |
| 9,228,444 | B2 | 1/2016 | Evans et al. | |
| 9,752,449 | B2 | 9/2017 | Bottome et al. | |
| 9,926,798 | B2 | 3/2018 | Vest | |
| 10,746,031 | B2 | 8/2020 | Heeter et al. | |

(Continued)

FOREIGN PATENT DOCUMENTS

| | | | |
|---|---|---|---|
| EP | 2108785 A2 * | 10/2009 | F01D 11/008 |
| EP | 2 837 773 B1 | 11/2016 | |
| WO | 2023/111454 A1 | 6/2023 | |

OTHER PUBLICATIONS

Jan. 30, 2024 Search Report issued in British Patent Application No. 2312487.8.

*Primary Examiner* — Nathaniel E Wiehe
*Assistant Examiner* — Art Golik
(74) *Attorney, Agent, or Firm* — Oliff PLC

(57) ABSTRACT

An annulus filler for mounting to a rotor disc of a gas turbine engine includes a coupling portion and an outer lid. The outer lid includes a leading edge, a trailing edge, a pair of longitudinal edges, and an outer radial surface. Each longitudinal edge includes a first edge portion and a second edge portion. At least one longitudinal edge includes a recessed portion that extends at least axially between the first edge portion and the second edge portion, such that the recessed portion connects the first edge portion to the second edge portion. The recessed portion further extends circumferentially inwards from each of the first edge portion and the second edge portion towards the other longitudinal edge.

12 Claims, 6 Drawing Sheets

(56) References Cited

U.S. PATENT DOCUMENTS

| | | | | |
|---|---|---|---|---|
| 11,131,202 | B2 | 9/2021 | Thompson et al. | |
| 2007/0020102 | A1* | 1/2007 | Beeck | F01D 5/3007 416/219 R |
| 2007/0189901 | A1* | 8/2007 | Dundas | F01D 11/008 416/223 A |
| 2015/0247414 | A1* | 9/2015 | Uskert | F01D 5/282 416/193 A |
| 2016/0115794 | A1* | 4/2016 | Thomas | B29C 70/222 29/889.21 |
| 2016/0376920 | A1* | 12/2016 | Luczak | F01D 5/26 416/1 |
| 2020/0095875 | A1* | 3/2020 | Sippel | F01D 5/326 |
| 2020/0392856 | A1* | 12/2020 | McCaffrey | F01D 5/081 |

* cited by examiner

ANNULUS FILLER FOR A GAS TURBINE ENGINE

CROSS-REFERENCE TO RELATED APPLICATIONS

This specification is based upon and claims the benefit of priority from Greek patent application number GR 20230100539 filed on Jul. 7, 2023, the entire contents of which is incorporated herein by reference.

BACKGROUND

1. Field of the Disclosure

The present disclosure generally relates to an annulus filler for a gas turbine engine.

2. Description of the Related Art

A rotor stage in a gas turbine engine generally includes a plurality of radially extending rotor blades mounted on a rotor disc. Passages between adjacent rotor blades near a radially inward portion adjacent to the rotor disc may be filled by platforms integral to the respective rotor blades or by annulus fillers, which are separate from the rotor blades. In the latter case, annulus fillers define a radially inward airflow surface for flow of air being drawn through the gas turbine engine as the air passes over the rotor disc.

Annulus fillers typically include an outer lid defining the radially inward airflow surface, and engagement features for removably attaching the annulus filler to the rotor disc. Since annulus fillers are separate from the rotor blades, a gap usually exists between the outer lid of the annulus filler and the adjacent rotor blade. The gap is designed to be as small as possible for maximising efficiency whilst avoiding any contact between the outer lid and the adjacent rotor blade during operating conditions. Generally, an optimum gap is determined based on cold build clearances and operating conditions of the rotor stage, including operating temperatures and vibrations.

Presence of the gap at a leading edge of the annulus filler may result in formulation of small vortical flow structures that are contained within the gap along a surface of the adjacent rotor blade. These vortical flow structures are different from secondary flow structures that are generated on a hub surface of the rotor blade due to presence of cross-passage static pressure gradients. The vortical flow structures may travel along a chord of the adjacent rotor blade and may influence a topology of an airflow in a main gas path. Specifically, the vortical flow structures may interact with the secondary flow structures and may affect a radial position, an intensity, and an axial position of generation of the secondary flow structures. The resulting flow travels downstream the gas turbine engine and may reduce an efficiency of the gas turbine engine.

SUMMARY

According to a first aspect, there is provided an annulus filler for mounting to a rotor disc of a gas turbine engine. The annulus filler includes a coupling portion connectable to the rotor disc. The annulus filler further includes an outer lid coupled to the coupling portion and extending axially, radially, and circumferentially with respect to a central axis. The outer lid is configured to be at least partially and circumferentially disposed between two adjacent blades connected to the rotor disc. The outer lid includes a leading edge that extends at least circumferentially with respect to the central axis. The outer lid further includes a trailing edge that is axially spaced apart from the leading edge and extends at least circumferentially with respect to the central axis. The outer lid further includes a pair of longitudinal edges circumferentially spaced apart from each other with respect to the central axis. Each of the pair of longitudinal edges extends at least axially between the leading edge and the trailing edge. Each longitudinal edge from the pair of longitudinal edges includes a first edge portion that extends at least axially from the leading edge towards the trailing edge and a second edge portion that extends at least axially from the trailing edge towards the leading edge with respect to the central axis. The outer lid further includes an outer radial surface disposed between the leading edge, the trailing edge, and the pair of longitudinal edges. The outer radial surface is configured to engage an air drawn through the gas turbine engine. At least one longitudinal edge from the pair of longitudinal edges further includes a recessed portion that extends at least axially between the first edge portion and the second edge portion with respect to the central axis, such that the recessed portion connects the first edge portion to the second edge portion. The recessed portion further extends circumferentially inwards from each of the first edge portion and the second edge portion towards the other longitudinal edge from the pair of longitudinal edges with respect to the central axis.

The at least one longitudinal edge of the outer lid includes the recessed portion that extends at least axially between the first edge portion and the second edge portion. In some embodiments, the outer lid of the annulus filler is circumferentially spaced apart from the adjacent blade by a nominal gap with respect to the central axis. The recessed portion may allow variation of a gap distribution between the at least one longitudinal edge of the outer lid and the adjacent blade. In other words, the recessed portion may allow the nominal gap to be varied.

The variable gap distribution serves to control vortical flow structures that develop within the nominal gap. Specifically, the variable gap distribution may prevent any re-injection of the vortical flow structures in a main gas path, thereby preventing interaction of the vortical flow structures with the main gas path. Isolation of these vortical flow structures and a control of their behaviour may result in an increased efficiency of a root component of the blade as well as reduction in induced forcing vibrations of downstream rotor stages of the gas turbine engine. Thus, an overall efficiency of the gas turbine engine may be improved.

In some embodiments, the recessed portion of the at least one longitudinal edge includes an inward edge section that extends at least axially with respect to the central axis. The inward edge section is at least circumferentially spaced apart from each of the first edge portion and the second edge portion towards the other longitudinal edge with respect to the central axis. The recessed portion further includes a first curved section that extends between and connects the first edge portion with the inward edge section. The recessed portion further includes a second curved section that extends between and connects the second edge portion with the inward edge section.

The inward edge section, the first curved section, and the second curved section may define a geometry of the recessed portion of the at least one longitudinal edge. The first curved section may define a curvature of the connection between the inward edge section and the first edge portion, while the second curved section may define a curvature of the connection between the inward edge section and the second edge portion. In some embodiments, each of the first curved section and the second curved section may allow a smooth transition of the at least one longitudinal edge between the inward edge section and the corresponding first edge portion or the second edge portion.

In some embodiments, each of the first curved section and the second curved section is concave with respect to the corresponding first edge portion or the second edge portion, such that the first curved section and the second curved section curve away from each other. Thus, each of the first curved section and the second curved section may allow a smooth transition of the at least one longitudinal edge between the inward edge section and the corresponding first edge portion or the second edge portion.

In some embodiments, each of the first curved section and the second curved section is convex with respect to the corresponding first edge portion or the second edge portion, such that the first curved section and the second curved section curve towards each other. Thus, each of the first curved section and the second curved section may allow a smooth transition of the at least one longitudinal edge between the inward edge section and the corresponding first edge portion or the second edge portion.

In some embodiments, the outer lid extends at least axially with respect to the central axis by a maximum axial length. The inward edge section is circumferentially spaced apart from each of the first edge portion and the second edge portion with respect to the central axis by a maximum circumferential distance. The maximum circumferential distance is at most 5% of the maximum axial length of the outer lid. The maximum circumferential distance may control an increase in the nominal gap between the outer lid of the annulus filler and the adjacent blade.

In some embodiments, the recessed portion of the at least one longitudinal edge extends at least axially with respect to the central axis by a maximum axial extent. The maximum axial extent of the recessed portion is less than or equal to 50% of the maximum axial length of the outer lid. Thus, the maximum axial extent of the recessed portion may influence isolation of the vortical flow structures or enable control of the behaviour of the vortical flow structures.

In some embodiments, an axial distance between the leading edge of the outer lid and a proximal end of the recessed portion with respect to the central axis is between 25% and 75% of the maximum axial length of the outer lid. The axial distance between the leading edge of the outer lid and the proximal end of the recessed portion may control the behaviour of the vortical flow structures.

In some embodiments, each longitudinal edge includes the recessed portion, such that the recessed portions of the pair of longitudinal edges extend at least circumferentially towards each other. Thus, the vortical flow structures that develop between each longitudinal edge of the outer lid and the corresponding adjacent blade may be isolated.

In some embodiments, the recessed portion of the at least one longitudinal edge further extends radially along 100% of a radial thickness of the outer lid with respect to the central axis. Thus, the recessed portion may define a hollowed portion enabling variation of the gap distribution.

According to a second aspect, there is provided a rotor assembly for a gas turbine engine. The rotor assembly includes a rotor disc and a plurality of blades coupled to the rotor disc and angularly spaced apart from each other. The rotor assembly further includes a plurality of annulus fillers according to the first aspect. Each of the plurality of annulus fillers bridges a gap between corresponding adjacent blades from the plurality of blades. The coupling portion of each annulus filler is coupled to the rotor disc.

In some embodiments, each blade includes a blade leading edge, a blade trailing edge spaced apart from the blade leading edge, a pressure surface that extends between the blade leading edge and the blade trailing edge, and a suction surface that extends between the blade leading edge and the blade trailing edge opposite to the pressure surface. Each blade defines a blade chord length between the blade leading edge and the blade trailing edge along the central axis at a radial span disposed at the outer radial surface of the annulus filler adjacent to the suction surface.

In some embodiments, an axial distance between the blade leading edge of the adjacent blade and the proximal end of the recessed portion with respect to the central axis is between 25% and 75% of the blade chord length. The axial distance between the blade leading edge of the adjacent blade and the proximal end of the recessed portion may control the behaviour of the vortical flow structures.

In some embodiments, the maximum axial extent of the recessed portion with respect to the central axis is less than or equal to 50% of the blade chord length. Thus, the maximum axial extent of the recessed portion may influence isolation of the vortical flow structures or enable control of the behaviour of the vortical flow structures.

In some embodiments, each of the first edge portion and the second edge portion of the at least one longitudinal edge is circumferentially spaced apart from the pressure surface or the suction surface of the adjacent blade by a nominal gap with respect to the central axis. The nominal gap is configured to minimize contact between the at least one longitudinal edge and the adjacent blade. The recessed portion is circumferentially spaced apart from the pressure surface or the suction surface of the adjacent blade with respect to the central axis by a maximum circumferential gap greater than the nominal gap. A difference between the maximum circumferential gap and the nominal gap is less than or equal to 5% of the blade chord length. The maximum circumferential gap may enable an increase in the nominal gap between the outer lid of the annulus filler and the pressure surface or the suction surface of the adjacent blade, thereby controlling the behaviour of the vortical flow structures.

According to a third aspect, there is provided a gas turbine engine including at least one annulus filler of the first aspect or a rotor assembly of the second aspect.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
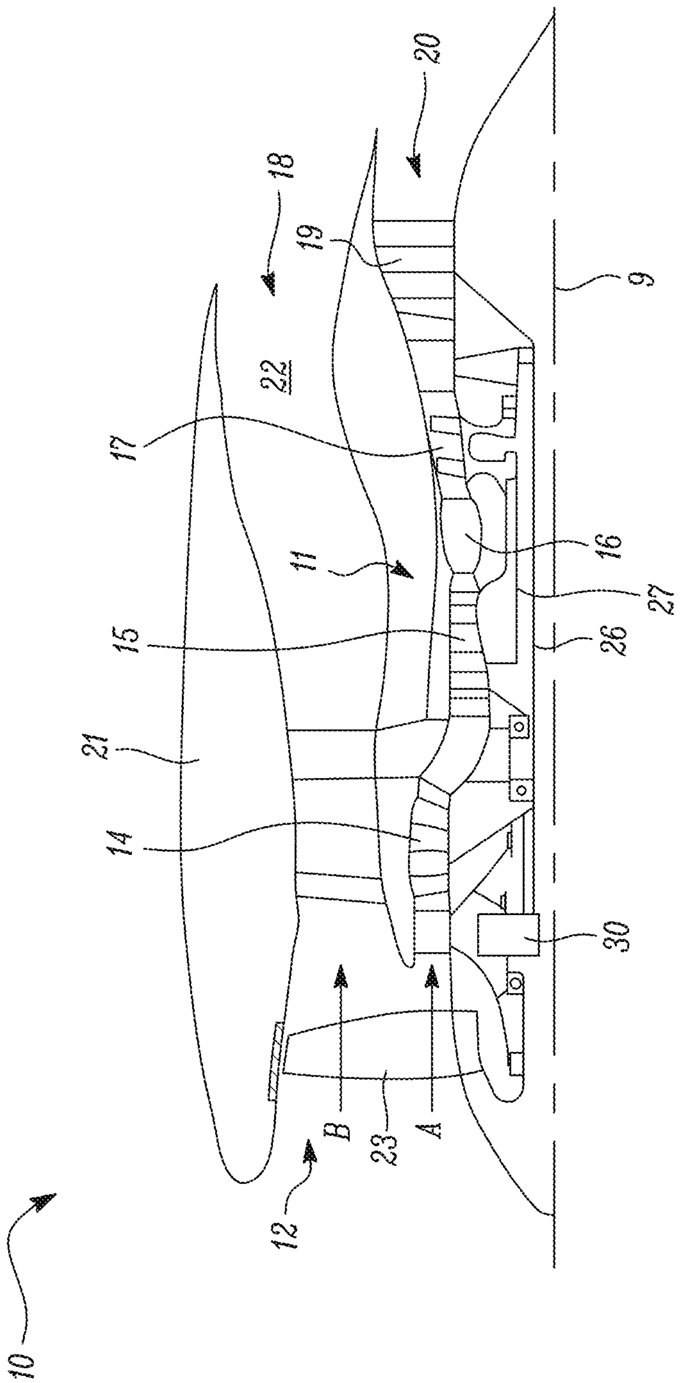
FIG. 1 is a sectional side view of a gas turbine engine.

FIG. 1 illustrates a gas turbine engine 10 having a principal rotational axis 9, according to an embodiment of the present disclosure. The gas turbine engine 10 comprises an air intake 12 and a propulsive fan 23 that generates two airflows: a core airflow A and a bypass airflow B. The gas turbine engine 10 further comprises an engine core 11 that receives the core airflow A. The engine core 11 comprises, in axial flow series, a low-pressure compressor 14, a high-pressure compressor 15, a combustion equipment 16, a high-pressure turbine 17, a low-pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the core exhaust nozzle 20 to provide some propulsive thrust. The high-pressure turbine 17 drives the high-pressure compressor 15 by a suitable interconnecting core shaft 27. The fan 23 generally provides the majority of the propulsive thrust. The epicyclic gearbox 30 is a reduction gearbox.

Note that the terms "low-pressure turbine" and "low-pressure compressor" as used herein may be taken to mean the lowest pressure turbine stages and lowest pressure compressor stages (i.e., not including the fan 23), respectively, and/or the turbine and compressor stages that are connected together by the interconnecting core shaft 27 with the lowest rotational speed in the gas turbine engine 10 (i.e., not including the gearbox output shaft that drives the fan 23). In some literature, the "low-pressure turbine" and "low-pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle), or a turboprop engine, for example. In some arrangements, the gas turbine engine 10 may not comprise the gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
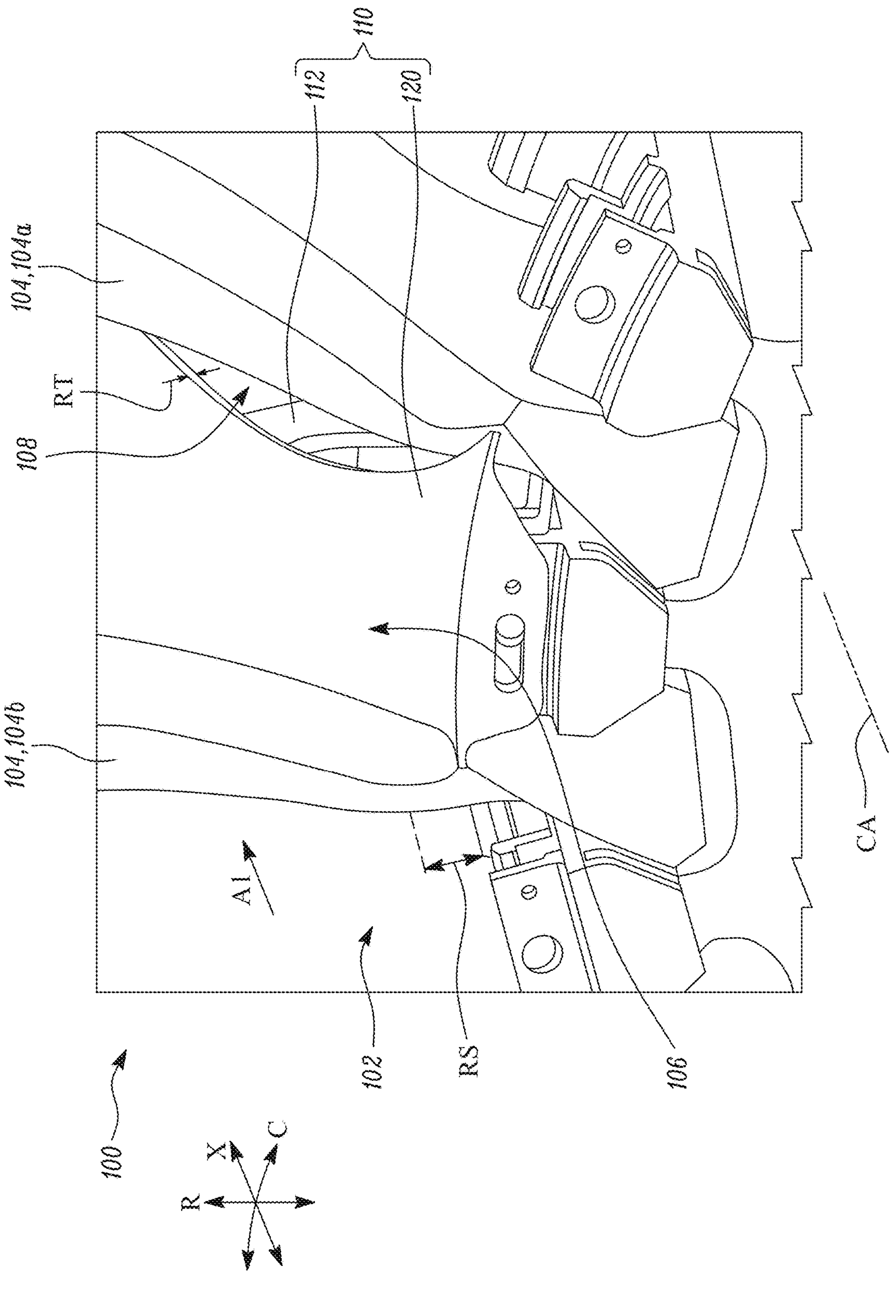
FIG. 2 is a partial schematic front perspective view of a rotor assembly of the gas turbine engine.

FIG. 2 is a partial schematic front perspective view of a rotor assembly 100 of the gas turbine engine 10 (shown in FIG. 1). In some embodiments, the rotor assembly 100 may be a part of the low-pressure compressor 14 (shown in FIG. 1). However, the rotor assembly 100 may also be a part of other compressors of the gas turbine engine 10, e.g., the high-pressure compressor 15 or the fan 23 shown in FIG. 1. The rotor assembly 100 includes a rotor disc 102. Specifically, FIG. 2 shows a portion of a radially outer surface of the rotor disc 102 of the rotor assembly 100.

An axial direction X is defined that is aligned with a central axis CA (or the principal rotational axis 9) of the gas turbine engine 10 (shown in FIG. 1). As used herein, terms that refer to an axial direction, such as "axially disposed", "axially extends", "axially spaced apart", "axially proximal", "axially between", "extend axially", and "extending axially" are with respect to the axial direction X. A radial direction R is defined with respect to the central axis CA perpendicular to the axial direction X. As used herein, terms that refer to a radial direction, such as "radially outer", "radially outside", "radially inner", "radially extends", "radially inwards", "radially outwards", "radially outwardly", "radially spaced apart", "radially proximal", "extend radially", and "extending radially" are with respect to the radial direction R. A circumferential direction C is defined with respect to the central axis CA. As used herein, terms that refer to a circumferential direction, such as "circumferentially extends", "circumferentially extending", "circumferentially spaced apart", "circumferentially surrounding", "circumferentially inclined", "circumferentially with respect to", "circumferentially disposed", "extend circumferentially", and "extending circumferentially" are with respect to the circumferential direction C.

The rotor assembly 100 further includes a plurality of blades 104 coupled to the rotor disc 102 and angularly spaced apart from each other. In the illustrated embodiment of FIG. 2, the blades 104*a*, 104*b* from the plurality of blades 104 are shown for the purpose of illustration. In some embodiments, the plurality of blades 104 are angularly spaced apart from each other along the circumferential direction C. In some embodiments, the rotor disc 102 may include retention grooves (not shown) for retaining a root portion (not shown) of the corresponding blade 104 from the plurality of blades 104. The retention grooves may be straight and extend in the axial direction X.

In some embodiments, the rotor assembly 100 further includes a plurality of annulus fillers 110. Only one annulus filler 110 from the plurality of annulus fillers 110 is shown in FIG. 2 for the purpose of illustration. Each of the plurality of annulus fillers 110 is mounted to the rotor disc 102 of the gas turbine engine 10 (shown in FIG. 1). Each of the plurality of annulus fillers 110 bridges a gap 106 between corresponding adjacent blades 104 from the plurality of blades 104. Specifically, each of the plurality of annulus fillers 110 bridges the gap 106 disposed at the radially outer surface of the rotor disc 102 between the corresponding adjacent blades 104. In the illustrated embodiment of FIG. 2, the annulus filler 110 bridges the gap 106 between the adjacent blades 104*a*, 104*b*. In some embodiments, the plurality of annulus fillers 110 may ensure a smooth surface for an air A1 drawn through the gas turbine engine 10 (shown in FIG. 1) to flow over as the air A1 passes through the rotor assembly 100. The term "plurality of annulus fillers 110" is interchangeably referred to hereinafter as the "annulus fillers 110".

In some embodiments, each annulus filler 110 may be made of carbon fibre reinforced composite material. Other suitable materials may include, but are not limited to, moulded polymer, fibre-reinforced polymer (e.g., glass, carbon, aramid, or polyurethane fibres in a thermosetting or thermoplastic polymer matrix), machined metal, extruded metal, cast metal, etc. Typical metals are aluminium, titanium, or magnesium alloys. Other polymer-based composite and metallic material may also be used based on application requirements. Each annulus filler 110 may be manufactured from relatively lightweight materials. In some embodiments, each annulus filler 110 may be integrally formed as a one-piece component. In some embodiments, each annulus filler 110 may be replaced independently of the corresponding adjacent blades 104, if required.

The annulus filler 110 includes a coupling portion 112 connectable to the rotor disc 102. Specifically, the coupling portion 112 of each annulus filler 110 is coupled to the rotor disc 102. In some embodiments, the coupling portion 112 may include axially spaced apart support structures (e.g., hooks, engaging structures, etc.) which are connectable to complementary securing members (not visible) on the rotor disc 102. In some embodiments, the support structures may allow each annulus filler 110 to be installed on the rotor disc 102 in a tool-less manner. In some embodiments, the support structures may transfer centrifugal and/or radial loads to the securing members on the rotor disc 102 when the rotor disc 102 spins about the central axis CA.

The annulus filler 110 further includes an outer lid 120 coupled to the coupling portion 112 and extending axially, radially, and circumferentially with respect to the central axis CA. In some embodiments, a shape of the outer lid 120 of the annulus filler 110 may be produced by revolving a desired profile around the central axis CA. The outer lid 120 and the rotor disc 102 may have a common central axis, i.e., the central axis CA. In some embodiments, the outer lid 120 extends axially along the axial direction X, radially along the radial direction R, and circumferentially along the circumferential direction C.

The outer lid 120 is configured to be at least partially and circumferentially disposed between two adjacent blades 104 connected to the rotor disc 102. In the illustrated embodiment of FIG. 2, the outer lid 120 of the annulus filler 110 is at least partially and circumferentially disposed between the adjacent blades 104*a*, 104*b*. Since the annulus filler 110 is separate from the adjacent blades 104*a*, 104*b*, a gap usually exists between the outer lid 120 of the annulus filler 110 and the adjacent blades 104*a*, 104*b*. For example, a gap 108 exists between the outer lid 120 and the adjacent blade 104*a*. Similarly, a gap (not shown) may also exist between the outer lid 120 and the adjacent blade 104*b*. Such a gap may be referred to herein as a nominal gap (e.g., a nominal gap G1 shown in FIG. 6).

In some embodiments, the gap (e.g., the gap 108) is designed to be as small as possible for maximising efficiency whilst avoiding any contact between the outer lid 120 and the adjacent blade 104 during operating conditions. The gap may be optimized based on cold build clearances and operating conditions of the rotor disc 102. Presence of the gap (e.g., the gap 108) may result in formulation of small vortical flow structures (not shown) which are contained within the gap along a surface of the adjacent blade 104. The vortical flow structures may travel along a chord of the adjacent blade 104.

Figure 3:
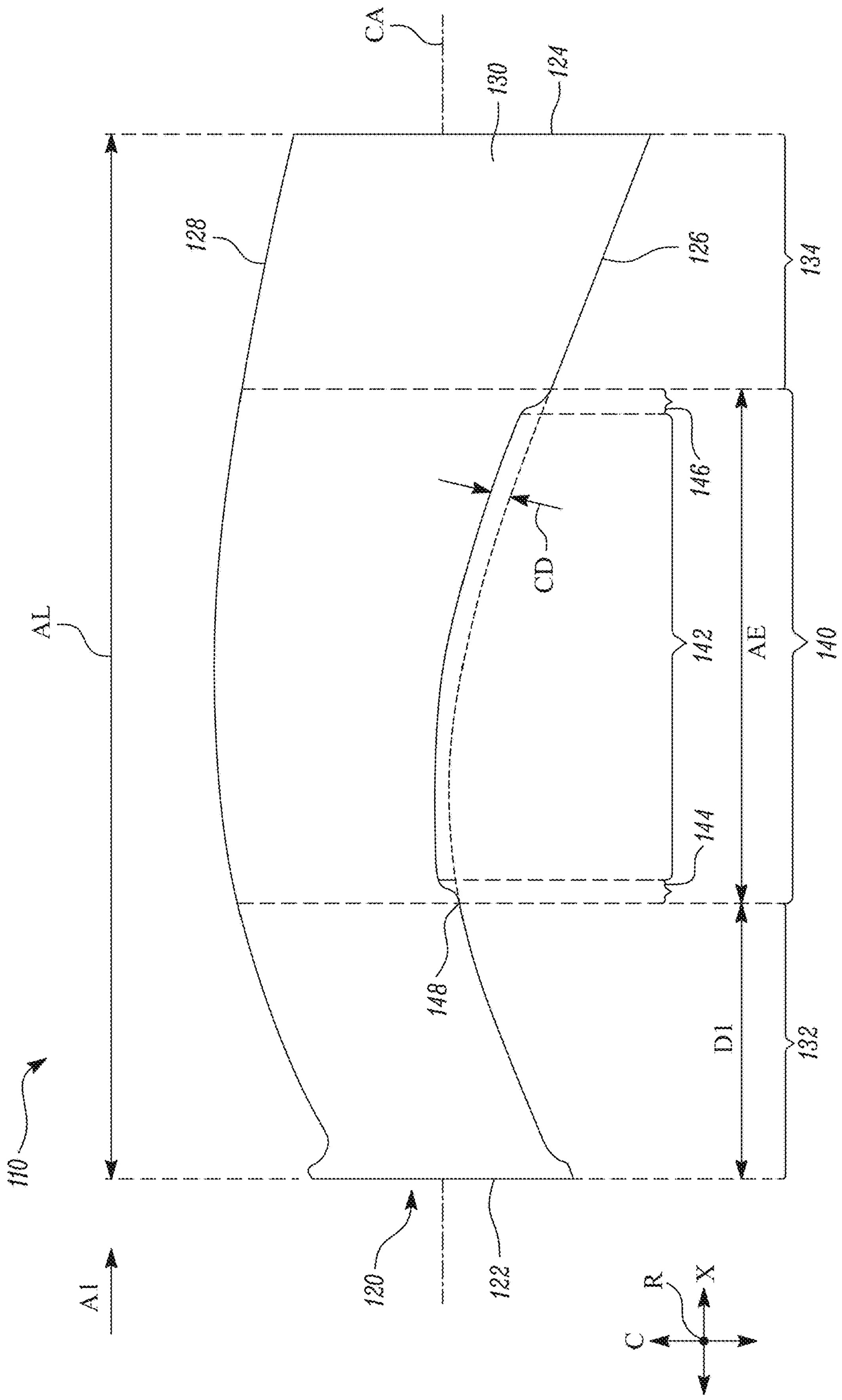
FIG. 3 is a schematic top view of an annulus filler of the rotor assembly.

FIG. 3 is a schematic top view of the annulus filler 110, according to an embodiment of the present disclosure. The outer lid 120 of the annulus filler 110 includes a leading edge 122 that extends at least circumferentially with respect to the central axis CA. The leading edge 122 may be an upstream circumferential edge of the outer lid 120 with respect to a direction of flow of the air A1. The outer lid 120 further includes a trailing edge 124 that is axially spaced apart from the leading edge 122 and extends at least circumferentially with respect to the central axis CA. The trailing edge 124 may be a downstream circumferential edge of the outer lid 120 with respect to the direction of flow of the air A1.

The outer lid 120 further includes a pair of longitudinal edges 126, 128 circumferentially spaced apart from each other with respect to the central axis CA. Each of the pair of longitudinal edges 126, 128 extends at least axially between the leading edge 122 and the trailing edge 124. Each longitudinal edge 126, 128 from the pair of longitudinal edges 126, 128 includes a first edge portion 132 that extends at least axially from the leading edge 122 towards the trailing edge 124 and a second edge portion 134 that extends at least axially from the trailing edge 124 towards the leading edge 122 with respect to the central axis CA.

The outer lid 120 further includes an outer radial surface 130 disposed between the leading edge 122, the trailing edge 124, and the pair of longitudinal edges 126, 128. In some embodiments, the outer radial surface 130 is further disposed opposite to the coupling portion 112 (shown in FIG. 2). The outer radial surface 130 is configured to engage the air A1 drawn through the gas turbine engine 10 (shown in FIG. 1). In other words, the outer radial surface 130 engages the air A1 as the air A1 is drawn through the rotor assembly 100 (shown in FIG. 2). In some embodiments, the outer radial surface 130 may enable smooth flow of the air A1 over the annulus filler 110.

At least one longitudinal edge 126, 128 from the pair of longitudinal edges 126, 128 further includes a recessed portion 140 that extends at least axially between the first edge portion 132 and the second edge portion 134 with respect to the central axis CA, such that the recessed portion 140 connects the first edge portion 132 to the second edge portion 134. The recessed portion 140 further extends circumferentially inwards from each of the first edge portion 132 and the second edge portion 134 towards the other longitudinal edge 126, 128 from the pair of longitudinal edges 126, 128 with respect to the central axis CA.

In the illustrated embodiment of FIG. 3, the longitudinal edge 126 includes the recessed portion 140 extending at least axially between the first edge portion 132 and the second edge portion 134 of the longitudinal edge 126 with respect to the central axis CA. The recessed portion 140 further extends circumferentially inwards from each of the first edge portion 132 and the second edge portion 134 of the longitudinal edge 126 towards the longitudinal edge 128 with respect to the central axis CA.

Referring to FIGS. 2 and 3, the recessed portion 140 may allow variation in a distribution of the gap 108 (shown in FIG. 2) between the outer lid 120 of the annulus filler 110 and the adjacent blade 104*a* (shown in FIG. 2). The variable distribution of the gap 108 serves to control the vortical flow structures that develop within the gap 108. Specifically, the variable distribution of the gap 108 may prevent any re-injection of the vortical flow structures in the main gas path, thereby preventing interaction of the vortical flow structures with the main gas path. Isolation of the vortical flow structures may improve an efficiency of the gas turbine engine 10 (shown in FIG. 1) while also enabling reduction in induced forcing vibrations of downstream rotor stages of the gas turbine engine 10.

In some embodiments, the recessed portion 140 of the at least one longitudinal edge 126, 128 further extends radially along 100% of a radial thickness RT (shown in FIG. 2) of the outer lid 120 with respect to the central axis CA. In the illustrated embodiment of FIG. 3, the recessed portion 140 of the longitudinal edge 126 further extends radially along 100% of the radial thickness RT (shown in FIG. 2) of the outer lid 120. Thus, the recessed portion 140 may define a hollowed portion enabling variation of the gap 108 between the outer lid 120 of the annulus filler 110 and the adjacent blade 104*a*.

In some embodiments, the recessed portion 140 of the at least one longitudinal edge 126, 128 includes an inward edge section 142 that extends at least axially with respect to the central axis CA. The inward edge section 142 is at least circumferentially spaced apart from each of the first edge portion 132 and the second edge portion 134 towards the other longitudinal edge 126, 128 with respect to the central axis CA. In the illustrated embodiment of FIG. 3, the recessed portion 140 of the longitudinal edge 126 includes the inward edge section 142. Further, the inward edge section 142 is at least circumferentially spaced apart from each of the first edge portion 132 and the second edge portion 134 of the longitudinal edge 126 towards the other longitudinal edge 128 with respect to the central axis CA.

In some embodiments, the recessed portion 140 further includes a first curved section 144 that extends between and connects the first edge portion 132 with the inward edge section 142. In some embodiments, the recessed portion 140 further includes a second curved section 146 that extends between and connects the second edge portion 134 with the inward edge section 142.

In some embodiments, the inward edge section 142, the first curved section 144, and the second curved section 146 may define a geometry of the recessed portion 140. The first curved section 144 may define a curvature of the connection between the inward edge section 142 and the first edge portion 132, while the second curved section 146 may define a curvature of the connection between the inward edge section 142 and the second edge portion 134. In some embodiments, each of the first curved section 144 and the second curved section 146 may allow a smooth transition of the at least one longitudinal edge 126 between the inward edge section 142 and the corresponding first edge portion 132 or the second edge portion 134. In some embodiments, each of the first curved section 144 and the second curved section 146 is concave with respect to the corresponding first edge portion 132 or the second edge portion 134, such that the first curved section 144 and the second curved section 146 curve away from each other.

In some embodiments, the outer lid 120 extends at least axially with respect to the central axis CA by a maximum axial length AL. In some embodiments, the inward edge section 142 is circumferentially spaced apart from each of the first edge portion 132 and the second edge portion 134 with respect to the central axis CA by a maximum circumferential distance CD. In some embodiments, the maximum circumferential distance CD is at most 5% of the maximum axial length AL of the outer lid 120. The maximum circumferential distance CD may control an increase in the gap 108 (shown in FIG. 2) between the outer lid 120 of the annulus filler 110 and the adjacent blade 104*a* (shown in FIG. 2).

In some embodiments, the recessed portion 140 of the at least one longitudinal edge 126 extends at least axially with respect to the central axis CA by a maximum axial extent AE. In some embodiments, the maximum axial extent AE of the recessed portion 140 is less than or equal to 50% of the maximum axial length AL of the outer lid 120. The maximum axial extent AE of the recessed portion 140 may influence isolation of the vortical flow structures or enable control of the behaviour of the vortical flow structures.

In some embodiments, an axial distance D1 between the leading edge 122 of the outer lid 120 and a proximal end 148 of the recessed portion 140 with respect to the central axis CA is between 25% and 75% of the maximum axial length AL of the outer lid 120. The axial distance D1 between the leading edge 122 of the outer lid 120 and the proximal end 148 of the recessed portion 140 may control the behaviour of the vortical flow structures.

Figure 4:
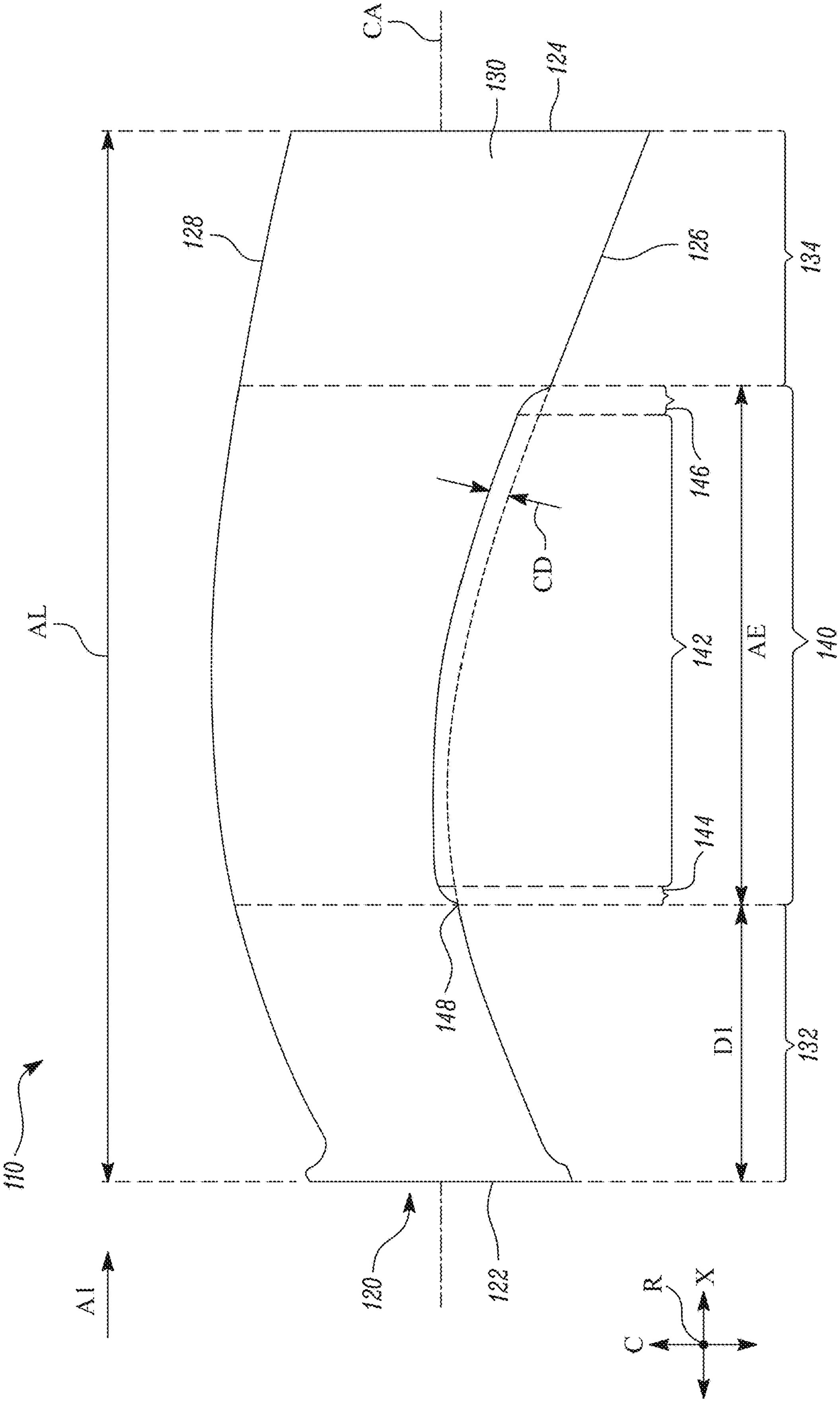
FIG. 4 is a schematic top view of an annulus filler.

FIG. 4 is a schematic top view of the annulus filler 110, according to another embodiment of the present disclosure. In the illustrated embodiment of FIG. 4, each of the first curved section 144 and the second curved section 146 is convex with respect to the corresponding first edge portion 132 or the second edge portion 134, such that the first curved section 144 and the second curved section 146 curve towards each other. Thus, each of the first curved section 144 and the second curved section 146 may allow a smooth transition of the longitudinal edge 126 between the inward edge section 142 and the corresponding first edge portion 132 or the second edge portion 134.

Figure 5:
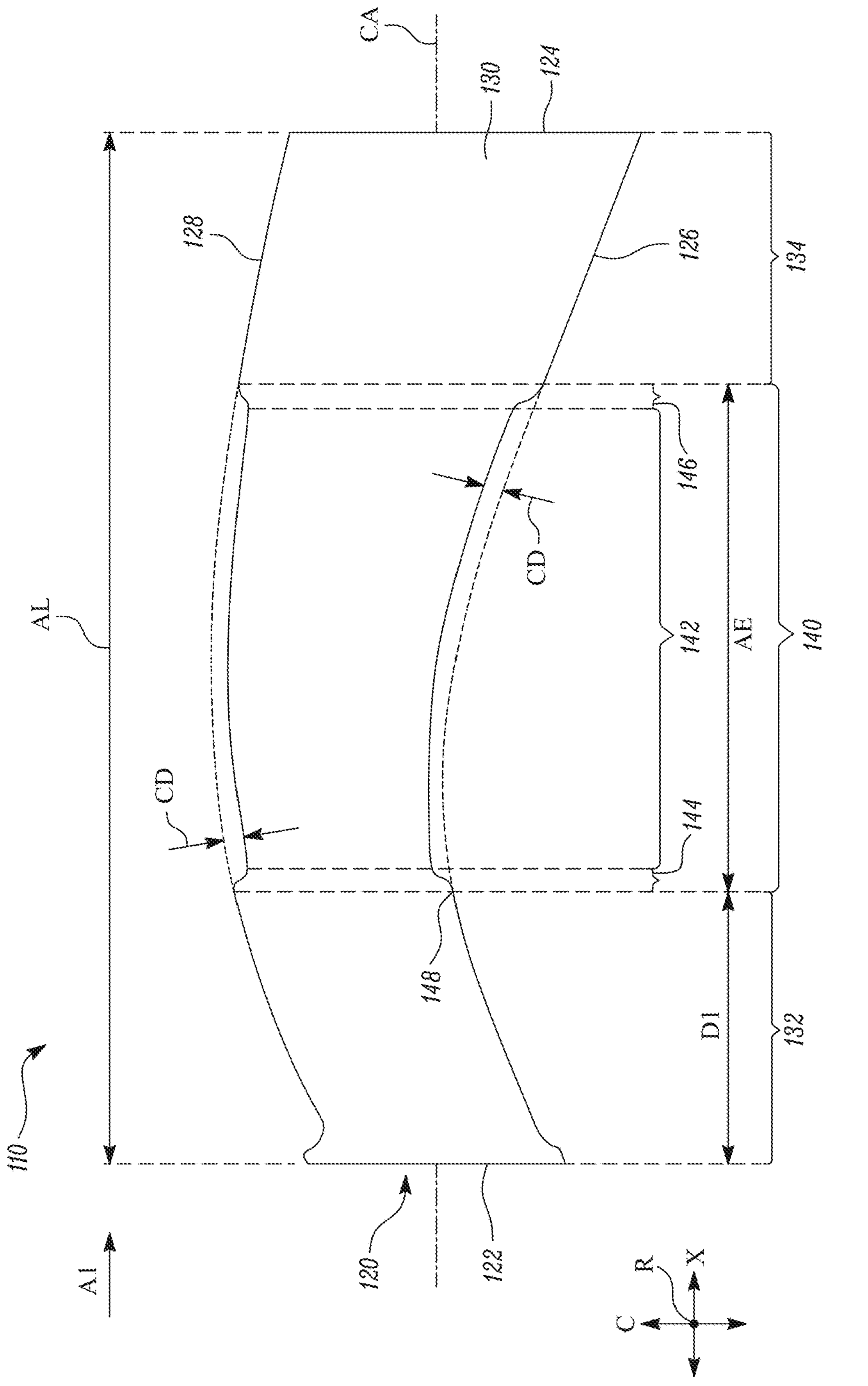
FIG. 5 is a schematic top view of an annulus filler.

FIG. 5 is a schematic top view of the annulus filler 110, according to yet another embodiment of the present disclosure. In the illustrated embodiment of FIG. 5, each longitudinal edge 126, 128 includes the recessed portion 140, such that the recessed portions 140 of the pair of longitudinal edges 126, 128 extend at least circumferentially towards each other. Thus, the vortical flow structures that develop adjacent to each longitudinal edge 126, 128 of the outer lid 120 may be isolated. The recessed portion 140 of the longitudinal edge 128 extends circumferentially inwards from each of the first edge portion 132 and the second edge portion 134 of the longitudinal edge 128 towards the longitudinal edge 126 with respect to the central axis CA.

Figure 6:
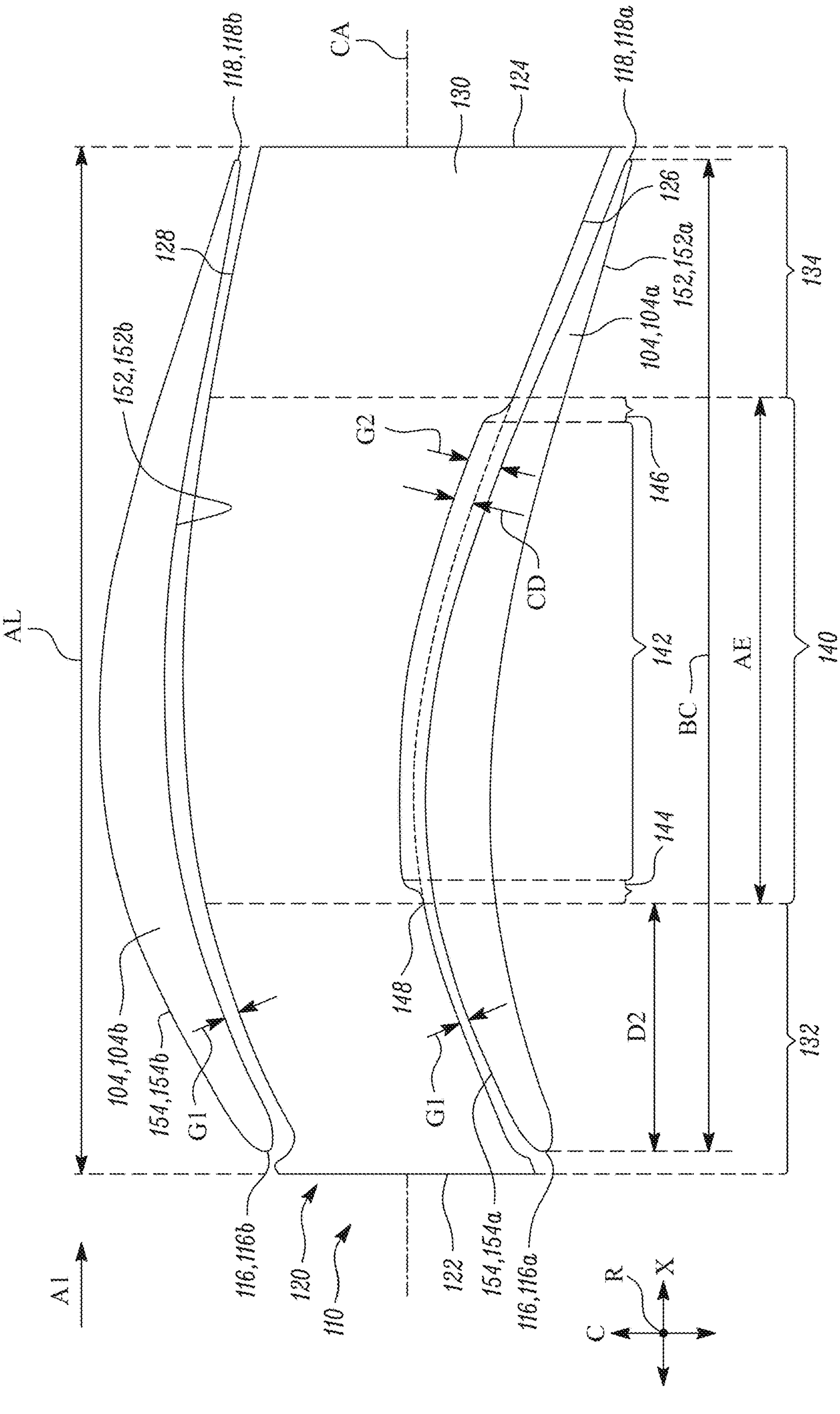
FIG. 6 is a schematic top view of the annulus filler of FIG. 3 disposed between adjacent blades of the rotor assembly.

FIG. 6 is a schematic top view of the annulus filler 110 of FIG. 3 disposed between corresponding adjacent blades 104 of the rotor assembly 100 (shown in FIG. 2). In the illustrated embodiment of FIG. 6, the blades 104*a*, 104*b* are shown for the purpose of illustration. The longitudinal edge 126 of the outer lid 120 is disposed adjacent to the blade 104*a* while the longitudinal edge 128 of the outer lid 120 is disposed adjacent to the blade 104*b*. Further, the longitudinal edge 126 includes the recessed portion 140. However, it should be noted that the longitudinal edge 128 of the outer lid 120 may also include the recessed portion 140.

In some embodiments, each blade 104 includes a blade leading edge 116, a blade trailing edge 118 spaced apart from the blade leading edge 116, a pressure surface 152 that extends between the blade leading edge 116 and the blade trailing edge 118, and a suction surface 154 that extends between the blade leading edge 116 and the blade trailing edge 118 opposite to the pressure surface 152.

In the illustrated embodiment of FIG. 6, the blade 104*a* includes the blade leading edge 116*a*, the blade trailing edge 118*a*, the pressure surface 152*a*, and the suction surface 154*a*. Similarly, the blade 104*b* includes the blade leading edge 116*b*, the blade trailing edge 118*b*, the pressure surface 152*b*, and the suction surface 154*b*. Each blade 104 (i.e., the blades 104*a*, 104*b*) defines a blade chord length BC between the blade leading edge 116 and the blade trailing edge 118 at a radial span RS (shown in FIG. 2) disposed at the outer radial surface 130 of the annulus filler 110 adjacent to the suction surface 154. As shown in FIG. 6, the blade 104*a* defines the blade chord length BC between the blade leading edge 116*a* and the blade trailing edge 118*a*.

In some embodiments, an axial distance D2 between the blade leading edge 116 of the adjacent blade 104 and the proximal end 148 of the recessed portion 140 with respect to the central axis CA is between 25% and 75% of the blade chord length BC. As shown in FIG. 6, the axial distance D2 between the blade leading edge 116*a* of the blade 104*a* and the proximal end 148 of the recessed portion 140 with respect to the central axis CA is between 25% and 75% of the blade chord length BC. The axial distance D2 between the blade leading edge 116 of the adjacent blade 104 and the proximal end 148 of the recessed portion 140 may control the behaviour of the vortical flow structures.

In some embodiments, the maximum axial extent AE of the recessed portion 140 with respect to the central axis CA is less than or equal to 50% of the blade chord length BC. The maximum axial extent AE of the recessed portion 140 may influence isolation of the vortical flow structures or enable control of the behaviour of the vortical flow structures.

In some embodiments, each of the first edge portion 132 and the second edge portion 134 of the at least one longitudinal edge 126, 128 is circumferentially spaced apart from the pressure surface 152 or the suction surface 154 of the adjacent blade 104 by the nominal gap G1 with respect to the central axis CA. In the illustrated embodiment of FIG. 6, each of the first edge portion 132 and the second edge portion 134 of the longitudinal edge 126 is circumferentially spaced apart from the suction surface 154*a* of the adjacent blade 104*a* by the nominal gap G1. Similarly, each of the first edge portion 132 and the second edge portion 134 of the longitudinal edge 128 is circumferentially spaced apart from the pressure surface 152*b* of the adjacent blade 104*b* by the nominal gap G1. In some embodiments, the nominal gaps G1 are configured to minimize contact between the longitudinal edges 126, 128 of the outer lid 120 and the respective adjacent blades 104*a*, 104*b*.

In some embodiments, the recessed portion 140 is circumferentially spaced apart from the pressure surface 152 or the suction surface 154 of the adjacent blade 104 with respect to the central axis CA by a maximum circumferential gap G2 greater than the nominal gap G1. In the illustrated embodiment of FIG. 6, the recessed portion 140 of the longitudinal edge 126 is circumferentially spaced apart from the suction surface 154*a* of the adjacent blade 104*a* by the maximum circumferential gap G2 greater than the nominal gap G1.

In some embodiments, a difference between the maximum circumferential gap G2 and the nominal gap G1 is less than or equal to 5% of the blade chord length BC. The maximum circumferential gap G2 may enable an increase in the nominal gap G1 between the outer lid 120 of the annulus filler 110 and the suction surface 154*a* of the adjacent blade 104*a*, thereby controlling the behaviour of the vortical flow structures.

Referring now to FIGS. 1-6, the at least one longitudinal edge 126, 128 of the outer lid 120 of the annulus filler 110 includes the recessed portion 140 that extends at least axially between the first edge portion 132 and the second edge portion 134 with respect to the central axis CA. Each of the first edge portion 132 and the second edge portion 134 is circumferentially spaced apart from the adjacent blade 104 by the nominal gap G1 with respect to the central axis CA. The recessed portion 140 of the at least one longitudinal edge 126, 128 may allow variation of the nominal gap G1 between the outer lid 120 of the annulus filler 110 and the adjacent blade 104. For example, the recessed portion 140 is circumferentially spaced apart from the suction surface 154*a* of the adjacent blade 104*a* with respect to the central axis CA by the maximum circumferential gap G2 greater than the nominal gap G1.

The variation of the nominal gap G1 serves to control vortical flow structures that develop within the nominal gap G1. Specifically, the recessed portion 140 may allow isolation of the vortical flow structures resulting in an increased efficiency of the gas turbine engine 10 as well as reduction in induced forcing vibrations of downstream rotor stages of the gas turbine engine 10.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A rotor assembly for a gas turbine engine, the rotor assembly comprising:

a rotor disc;

a plurality of blades coupled to the rotor disc and angularly spaced apart from each other; and a plurality of annulus fillers, each of the plurality of annulus fillers bridging a gap between corresponding adjacent blades from the plurality of blades, wherein a coupling portion of each annulus filler is coupled to the rotor disc, wherein each blade comprises a blade leading edge, a blade trailing edge spaced apart from the blade leading edge, a pressure surface that extends between the blade leading edge and the blade trailing edge, and a suction surface that extends between the blade leading edge and the blade trailing edge opposite to the pressure surface, and wherein each blade defines a blade chord length between the blade leading edge and the blade trailing edge along a central axis at a radial span disposed at an outer radial surface of the annulus filler adjacent to the suction surface, wherein an axial distance between the blade leading edge of the adjacent blade and a proximal end of a recessed portion with respect to the central axis is between 25% and 75% of the blade chord length, and wherein each of the annulus fillers in the plurality of the annulus fillers comprise:

the coupling portion connectable to the rotor disc; and an outer lid coupled to the coupling portion and extending axially, radially, and circumferentially with respect to the central axis, wherein the outer lid is configured to be at least partially and circumferentially disposed between two adjacent blades connected to the rotor disc, and wherein the outer lid comprises:

a leading edge that extends at least circumferentially with respect to the central axis;

a trailing edge that is axially spaced apart from the leading edge and extends at least circumferentially with respect to the central axis;

a pair of longitudinal edges circumferentially spaced apart from each other with respect to the central axis, wherein each of the pair of longitudinal edges extends at least axially between the leading edge and the trailing edge, wherein each longitudinal edge from the pair of longitudinal edges comprises a first edge portion that extends at least axially from the leading edge towards the trailing edge and a second edge portion that extends at least axially from the trailing edge towards the leading edge with respect to the central axis; and the outer radial surface disposed between the leading edge, the trailing edge, and the pair of longitudinal edges, wherein the outer radial surface is configured to engage an air drawn through the gas turbine engine;

wherein at least one longitudinal edge from the pair of longitudinal edges further comprises the recessed portion that extends at least axially between the first edge portion and the second edge portion with respect to the central axis, such that the recessed portion connects the first edge portion to the second edge portion, and wherein the recessed portion further extends circumferentially inwards from each of the first edge portion and the second edge portion towards the other longitudinal edge from the pair of longitudinal edges with respect to the central axis.

2. The rotor assembly of claim 1, wherein the recessed portion of the at least one longitudinal edge comprises:

an inward edge section that extends at least axially with respect to the central axis, wherein the inward edge section is at least circumferentially spaced apart from each of the first edge portion and the second edge portion towards the other longitudinal edge with respect to the central axis;

a first curved section that extends between and connects the first edge portion with the inward edge section; and a second curved section that extends between and connects the second edge portion with the inward edge section.

3. The rotor assembly of claim 2, wherein each of the first curved section and the second curved section is concave with respect to the corresponding first edge portion or the second edge portion, such that the first curved section and the second curved section curve away from each other.

4. The rotor assembly of claim 2, wherein each of the first curved section and the second curved section is convex with respect to the corresponding first edge portion or the second edge portion, such that the first curved section and the second curved section curve towards each other.

5. The rotor assembly of claim 2, wherein the outer lid extends at least axially with respect to the central axis by a maximum axial length, wherein the inward edge section is circumferentially spaced apart from each of the first edge portion and the second edge portion with respect to the central axis by a maximum circumferential distance, and wherein the maximum circumferential distance is at most 5% of the maximum axial length of the outer lid.

6. The rotor assembly of claim 5, wherein the recessed portion of the at least one longitudinal edge extends at least axially with respect to the central axis by a maximum axial extent, and wherein the maximum axial extent of the recessed portion is less than or equal to 50% of the maximum axial length of the outer lid.

7. The rotor assembly of claim 5, wherein an axial distance between the leading edge of the outer lid and a proximal end of the recessed portion with respect to the central axis is between 25% and 75% of the maximum axial length of the outer lid.

8. The rotor assembly of claim 1, wherein each longitudinal edge comprises the recessed portion, such that the recessed portions of the pair of longitudinal edges extend at least circumferentially towards each other.

9. The rotor assembly of claim 1, wherein the recessed portion of the at least one longitudinal edge further extends radially along 100% of a radial thickness of the outer lid with respect to the central axis.

10. The rotor assembly of claim 1, wherein the recessed portion of the at least one longitudinal edge of each of the plurality of annulus fillers comprises:

an inward edge section that extends at least axially with respect to the central axis, wherein the inward edge section is at least circumferentially spaced apart from each of the first edge portion and the second edge portion towards the other longitudinal edge with respect to the central axis;

a first curved section that extends between and connects the first edge portion with the inward edge section; and a second curved section that extends between and connects the second edge portion with the inward edge section; and wherein the outer lid extends at least axially with respect to the central axis by a maximum axial length, wherein the inward edge section is circumferentially spaced apart from each of the first edge portion and the second edge portion with respect to the central axis by a maximum circumferential distance, and wherein the maximum circumferential distance is at most 5% of the maximum axial length of the outer lid;

wherein the recessed portion of the at least one longitudinal edge extends at least axially with respect to the central axis by a maximum axial extent, and wherein the maximum axial extent of the recessed portion is less than or equal to 50% of the maximum axial length of the outer lid; and wherein the maximum axial extent of the recessed portion with respect to the central axis is less than or equal to 50% of the blade chord length.

11. The rotor assembly of claim 1, wherein each of the first edge portion and the second edge portion of the at least one longitudinal edge is circumferentially spaced apart from the pressure surface or the suction surface of the adjacent blade by a nominal gap with respect to the central axis, wherein the nominal gap is configured to minimize contact between the at least one longitudinal edge and the adjacent blade, wherein the recessed portion is circumferentially spaced apart from the pressure surface or the suction surface of the adjacent blade with respect to the central axis by a maximum circumferential gap greater than the nominal gap, and wherein a difference between the maximum circumferential gap and the nominal gap is less than or equal to 5% of the blade chord length.

12. A gas turbine engine including the rotor assembly of claim 1.

* * * * *